US012712350B2

(12) United States Patent
Coignet

(10) Patent No.: US 12,712,350 B2
(45) Date of Patent: Aug. 18, 2026

(54) DYNAMIC CABLE SUPPORT FOR FLOATING OFFSHORE WIND TURBINES

(71) Applicant: Schlumberger Technology Corporation, Sugar Land, TX (US)

(72) Inventor: Anthony Coignet, Abbeville (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 19/125,749

(22) PCT Filed: Dec. 20, 2023

(86) PCT No.: PCT/US2023/085000
§ 371 (c)(1),
(2) Date: Apr. 30, 2025

(87) PCT Pub. No.: WO2024/137737
PCT Pub. Date: Jun. 27, 2024

(65) Prior Publication Data

US 2026/0011995 A1 Jan. 8, 2026

Related U.S. Application Data

(60) Provisional application No. 63/476,646, filed on Dec. 22, 2022.

(51) Int. Cl.
*H02G 1/10* (2006.01)
*F03D 9/25* (2016.01)
(Continued)

(52) U.S. Cl.
CPC ............... *H02G 9/12* (2013.01); *F03D 9/255* (2017.02); *F03D 13/256* (2023.08)

(58) Field of Classification Search
CPC .. H02G 9/12; H02G 1/10; F03D 9/255; F03D 13/256; F03D 80/00; F03D 80/85;
(Continued)

(56) References Cited

U.S. PATENT DOCUMENTS 3,710,726 A * 1/1973 Buchholz ................ B61B 12/02 212/346
4,166,596 A * 9/1979 Mouton, Jr. .............. F03D 9/25 244/33
(Continued)

FOREIGN PATENT DOCUMENTS

EP 2821335 A1 1/2015

OTHER PUBLICATIONS

International Search Report and Written Opinion of International Patent Application No. PCT/US2023/085000 dated on Apr. 24, 2024, 11 pages.

*Primary Examiner* — Edwin J Toledo-Duran
(74) *Attorney, Agent, or Firm* — Jeffrey D. Frantz

(57) ABSTRACT

An apparatus that a wind turbine configured for floating on a surface of water, wherein the wind turbine is operable to generate electrical energy. The wind turbine can include a floating base configured to support the wind turbine on the surface of water, and a cable configured to transmit the electrical energy. The wind turbine can also include a first sheave configured to support a part of the cable, and a second sheave configured to support a part of the cable. The cable is reeved between the first sheave and second sheave, and the first sheave is operable to impart a predetermined force to the cable to thereby maintain the cable at a predetermined tension.

7 Claims, 3 Drawing Sheets

(51) Int. Cl.
*F03D 13/25* (2016.01)
*H02G 9/12* (2006.01)

(58) Field of Classification Search
CPC ......... F03D 13/20; F03D 80/10; Y02E 10/72; Y02E 10/727; Y02E 10/728; E04H 12/342; E04H 12/085; F05B 2260/30; F05B 2240/40
See application file for complete search history.

(56) References Cited

U.S. PATENT DOCUMENTS 4,184,209 A * 1/1980 Crist ...................... G01V 1/143 367/1
4,226,404 A * 10/1980 Zens ...................... F04B 47/04 187/404
4,285,502 A * 8/1981 Lub ...................... B66D 1/50 242/157 R
4,417,846 A * 11/1983 Elliston ...................... E21B 19/14 294/90
4,516,033 A * 5/1985 Olson ...................... F03B 17/062 416/85
4,641,596 A * 2/1987 Reprogle ...................... B66F 7/04 114/365
4,748,927 A * 6/1988 Bujacich ...................... B63B 39/06 242/157 R
4,756,666 A * 7/1988 Labrador ...................... F03D 5/04 416/8
4,859,146 A * 8/1989 Labrador ...................... F03D 5/04 416/8
5,067,608 A * 11/1991 McLellan ...................... B65G 15/60 414/520
5,294,066 A * 3/1994 Lacour ...................... B66C 13/12 242/396.5
5,889,336 A * 3/1999 Tateishi ...................... F03B 13/1865 290/43
6,425,708 B1 * 7/2002 Siegfriedsen ...................... F03D 9/257 405/169
9,738,351 B2 * 8/2017 Bergua ...................... F03D 13/25
2004/0169376 A1 * 9/2004 Ruer ...................... E02D 27/425 290/55
2005/0218656 A1 * 10/2005 Wobben ...................... F03D 13/20 290/55
2006/0273594 A1 * 12/2006 Gehring ...................... F03B 13/1885 290/42
2008/0240864 A1 * 10/2008 Belinsky ...................... F03D 13/22 290/55
2009/0278353 A1 * 11/2009 Da Costa Duarte Pardal ...................... F03D 15/10 290/55
2010/0132137 A1 * 6/2010 Eggleston ...................... B08B 1/34 15/21.1
2011/0018275 A1 * 1/2011 Sidenmark ...................... F03B 13/1815 290/53
2011/0111936 A1 * 5/2011 Shabodyash ...................... A63B 22/0235 482/142
2012/0049533 A1 * 3/2012 Kelly ...................... F03D 9/25 290/55
2012/0112472 A1 * 5/2012 Murray ...................... H02J 15/10 290/1 R
2013/0052014 A1 * 2/2013 Kelly ...................... F03D 5/04 416/66
2013/0269333 A1 10/2013 Williams
2014/0020613 A1 1/2014 Woo
2016/0131101 A1 * 5/2016 Bein ...................... F03B 13/10 29/428
2018/0112373 A1 * 4/2018 Hout ...................... B63H 19/08
2018/0347549 A1 12/2018 Huot
2019/0360452 A1 * 11/2019 Qu ...................... F03B 13/1875
2020/0003183 A1 * 1/2020 Rothers ...................... F03D 13/20
2020/0144797 A1 * 5/2020 Bruijnse ...................... H02G 1/06
2022/0029398 A1 * 1/2022 Neuhold ...................... H02G 3/0462
2024/0278876 A1 * 8/2024 Siegfriedsen ...................... F03D 13/25
2024/0332855 A1 * 10/2024 Mayer ...................... B63B 21/50

* cited by examiner

DYNAMIC CABLE SUPPORT FOR FLOATING OFFSHORE WIND TURBINES

CROSS-REFERENCE TO RELATED APPLICATION

This application is a National Stage Entry of International Application No. PCT/US2023/085000, filed on Dec. 20, 2023, which claims priority to U.S. Provisional Patent Application No. 63/476,646, filed on Dec. 22, 2023, which is incorporated by reference herein.

BACKGROUND OF THE DISCLOSURE

Offshore wind is a promising source of renewable energy because offshore wind is more intense and uniform than onshore wind. As more and larger wind farms are installed across the world, the deployment of more powerful wind turbines has established the offshore wind as a modern giant of the energy sector.

Majority of wind farms currently are being developed in prime shallow-water locations with a depth of up to 50 to 60 meters. However, up to 80% of the world's strongest wind resources can be found in areas where the water is much deeper, meaning a major chunk of offshore wind potential remains untapped. To harness wind energy in deeper waters further offshore, one solution is to build floating wind turbines, which are mounted on floating structures that are tethered in position. Floating wind turbines face technical challenges different from both onshore wind turbines and floating oil and gas platforms.

Like bottom-fixed offshore wind farms, exporting energy from floating wind farms to onshore and/or other offshore facilities uses high-capacity subsea cables, known in the art as dynamic cables. While conventional subsea cables are installed or secured on the sea floor, dynamic cables used for floating offshore wind turbines have floating components that permit them to move with water currents (e.g., tidal currents). Dynamic cables are thus continuously subjected to tensile, bending, and twisting forces caused by movements of the floating structures, waves, and water currents. Therefore, dynamic cables frequently experience mechanical damage caused by the harsh dynamic subsea environment and have to be replaced.

The dynamic cable and other underwater components of a floating offshore wind turbine are also prone to biofouling by marine organisms, such as 'slime' and barnacles, which can systematically degrade structural integrity and operational efficiency of the dynamic cable and other underwater components. For example, accumulation of biofoulers on cable and other components can increase both hydrodynamic volume, average density, and hydrodynamic friction of the dynamic cable and other underwater components.

BRIEF DESCRIPTION OF THE DRAWINGS

The present disclosure is understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
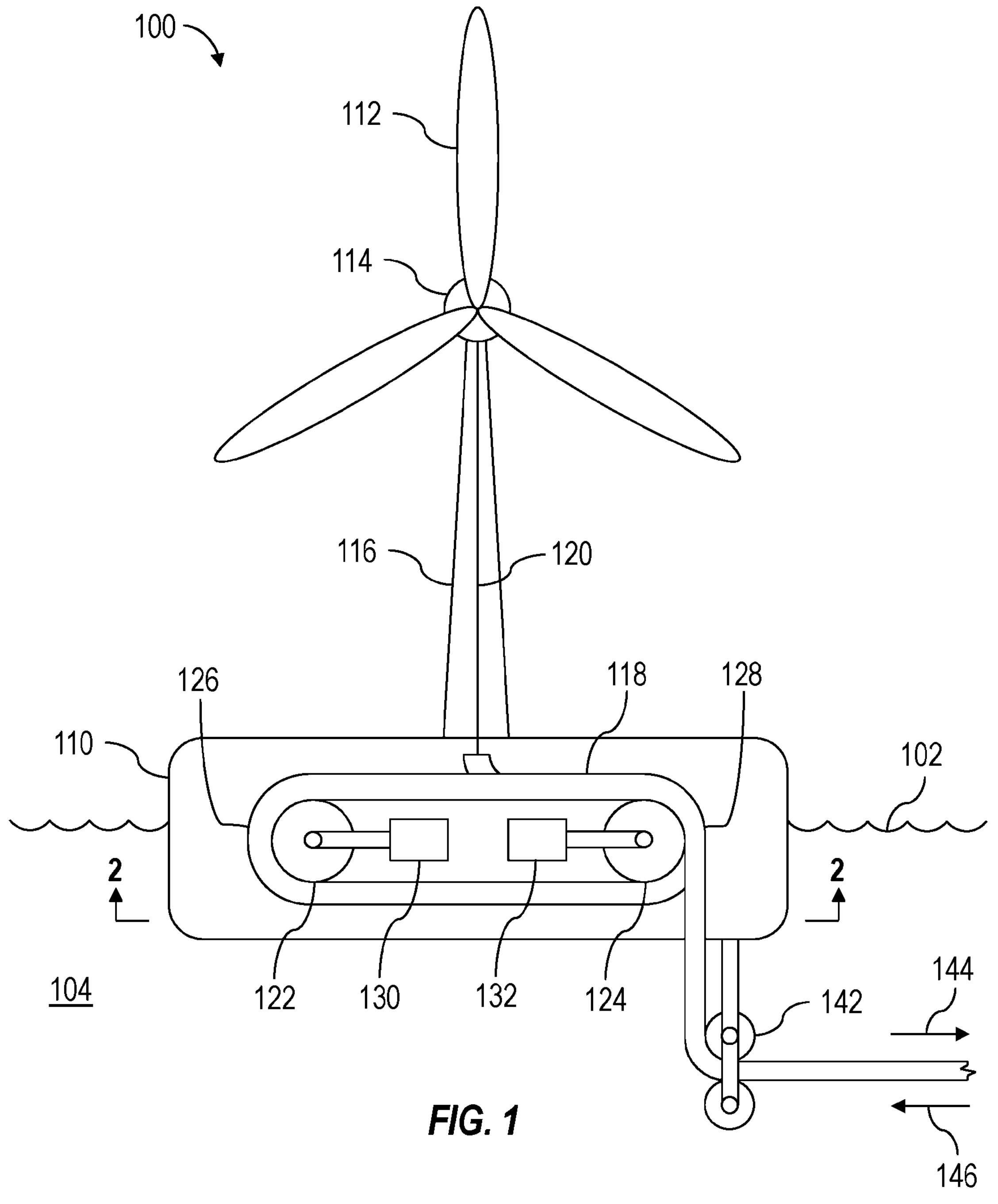
FIG. 1 is a schematic side view of at least a portion of an example implementation of apparatus according to one or more aspects of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for simplicity and clarity, and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

FIG. 1 is a schematic side view of at least a portion of an example implementation of a wind turbine 100 operable to generate electrical energy, representing an example environment in which one or more aspects of the present disclosure described below may be implemented. The wind turbine 100 may be configured for floating on a surface 102 of a natural body of water 104.

The wind turbine 100 may comprise a floating base 110 configured to support the wind turbine 100 on the surface 102 of the water 104. The floating base 110 may comprise or contain empty space and/or low-density material (e.g., foam) to facilitate buoyancy of the floating base 110, thereby permitting the floating base 110 to support the wind turbine 100 on the surface 102 of the water 104. The wind turbine 100 may further comprise a rotor 112 for converting wind energy to rotational energy. The rotor 112 may be connected to an electric generator 114 for converting rotational energy to electrical energy. A vertical support structure 116 may support the rotor 112 and generator 114 above the floating base 110. The wind turbine 100 may further comprise a dynamic cable 118 configured to transmit the electrical energy from the wind turbine 100 to another wind turbine or an onshore or offshore facility (e.g., an electrical distribution facility, a point of use facility, etc.), at which the electrical energy can be distributed or used. The dynamic cable 118 may be used in (i.e., extend through) a subsea environment below the surface 102 of the water 104 to transmit the electrical energy from the wind turbine 100 to another wind turbine or an onshore or offshore facility. An electrical conductor 120 may extend between the generator 114 and an end of the dynamic cable 118 to electrically connect the generator 114 to the dynamic cable 118.

The wind turbine 100 may further comprise a plurality of sheaves 122, 124 configured to support (or hold) the dynamic cable 118. The dynamic cable 118 may be reeved (or threaded) between (or around) the sheaves 122, 124. The sheaves 122, 124 may be disposed within the floating base 110, such that at least a portion (or segment) of the dynamic cable 118 is also disposed within the floating base 110. A portion of the dynamic cable 118 not reeved between the sheaves 122, 124 may extend out of the floating base 110 to another wind turbine or an onshore or offshore facility through the water 104 surrounding the floating base 110. The plurality of sheaves 122, 124 may comprise a first sheave 122 configured to support a first part (i.e., a portion or segment) 126 of the dynamic cable 118, and a second sheave 124 configured to support a second part 128 of the dynamic cable 118. The first sheave 122 and/or the second sheave 124 may be operable to impart the predetermined force to the dynamic cable 118 to thereby maintain the dynamic cable 118 at the predetermined tension.

Figure 2:
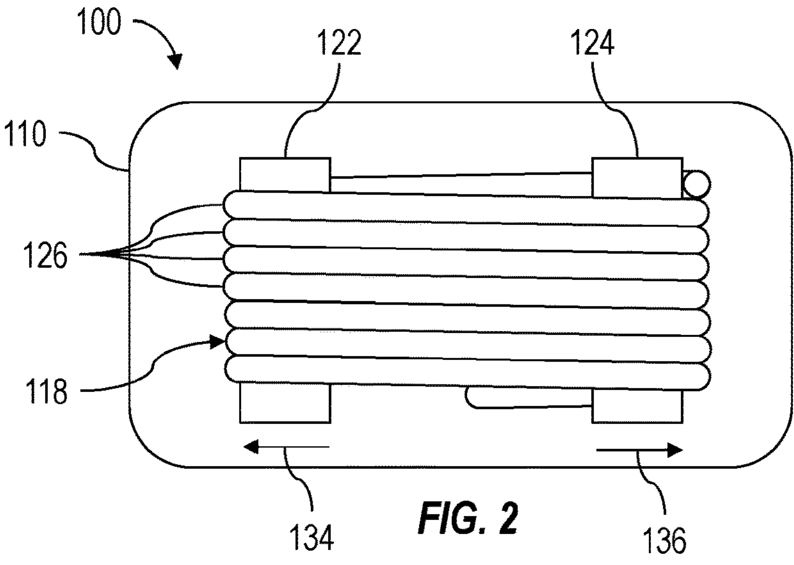
FIG. 2 is a schematic bottom view of a portion of the apparatus shown in FIG. 1.

FIG. 2 is a bottom view of a portion of the wind turbine 100 shown in FIG. 1. Accordingly, the following description refers to FIGS. 1 and 2, collectively.

The first sheave 122 may be or comprise a first sheave block comprising a plurality of sheaves configured to support a plurality of first parts 126 of the dynamic cable 118, and the second sheave 124 may be or comprise a second sheave block comprising a plurality of sheaves configured to support a plurality of second parts 128 of the dynamic cable 118. Thus, the dynamic cable 118 may be reeved a plurality of times between the first sheave 122 and the second sheave 124.

Figure 3:
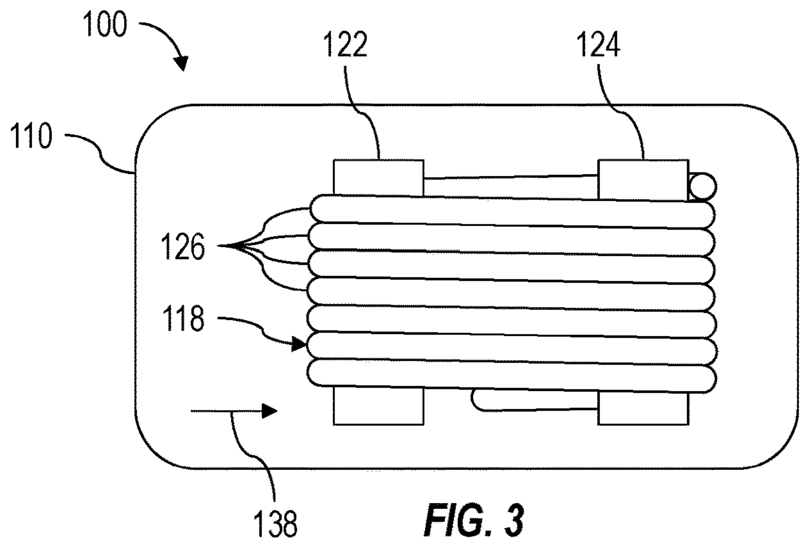
FIGS. 3 and 4 are schematic bottom views of the apparatus shown in FIG. 2 in different stages of operation.
Figure 4:
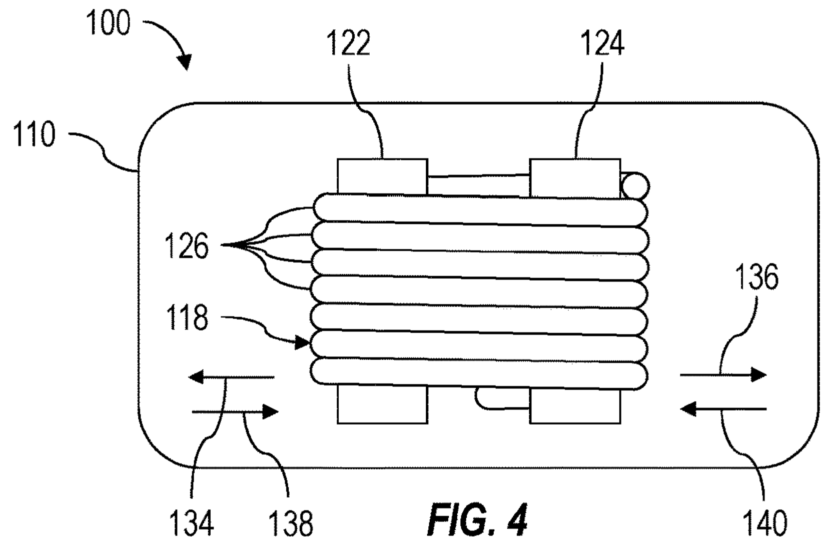

FIGS. 3 and 4 are bottom views of a portion of the wind turbine 100 shown in FIG. 2 in different operational states. Accordingly, the following description refers to FIGS. 1-4, collectively.

One or more of the sheaves 122, 124 may be operable to impart a predetermined force to the dynamic cable 118 to thereby maintain the dynamic cable 118 at a predetermined tension. For example, the first sheave 122 may be operable to move away from the second sheave 124, as indicated by arrow 134, at the predetermined force to thereby maintain the dynamic cable 118 at the predetermined tension. The second sheave 124 may also or instead be operable to move away from the first sheave 122, as indicated by arrow 136, at the predetermined force to thereby maintain the dynamic cable 118 at the predetermined tension.

However, when movement of the water 104 (e.g., tidal currents, storm currents or surges, etc.) causes an increased tension in the dynamic cable 118, such as by pulling on a portion of the dynamic cable 118 located outside of the floating base 110, the increased tension in the dynamic cable 118 may force the first sheave 122 to move (i.e., back up or retract) toward the second sheave 124, as indicated by arrow 138, and/or the second sheave 124 to move (i.e., back up or retract) toward the first sheave 122, as indicated by arrow 140. Such motion of the first sheave 122 and/or the second sheave 124 may decrease the distance between the first sheave 122 and the second sheave 124, thereby permitting the dynamic cable 118 to be pulled out from between the first sheave 122 and second sheave 124, out of the floating base 110, and move with the water 104, as indicated by arrow 144. As the dynamic cable 118 is pulled out, tension in the dynamic cable 118 is maintained at or near the predetermined tension. However, when the water 104 does not cause the increased tension in the dynamic cable 118, such as by no longer pulling on the portion of the dynamic cable 118 located outside of the floating base 110, the first sheave 122 may move away from the second sheave 124, as indicated by arrow 134, and/or the second sheave 124 to move away from the first sheave 122, as indicated by arrow 136, increasing the distance between the first sheave 122 and the second sheave 124 to thereby retract the dynamic cable 118 to the space between the first sheave 122 and second sheave 124, and into the floating base 110, as indicated by arrow 146. When the dynamic cable 118 is retracted to the space between the first sheave 122 and second sheave 124 within the floating base 110, the dynamic cable 118 may not experience tensile, bending, and twisting forces caused by the waves and water currents.

As the dynamic cable 118 is pulled out of the floating base 110 from between the sheaves 122, 124 or as the dynamic cable 118 is retracted to the space between the sheaves 122, 124 within the floating base 110, the dynamic cable 118 may be guided out of and into the floating base 110 by a guiding member (or device) 142. The guiding member 142 may be or comprise one or more rollers, drums, pulleys, funnels, and/or other cable guides configured to direct the dynamic cable 118 out of and into the floating base 110 such that the dynamic cable 118 does not contact the floating base 110 and/or to reduce friction between the dynamic cable 118 and the floating base 110.

The wind turbine 100 may further comprise a first actuator 130 operatively connected to the first sheave 122. The first actuator 130 may be operable to impart the predetermined force to the first sheave 122 to thereby impart the predetermined force to the dynamic cable 118 and, thus, maintain the dynamic cable 118 at the predetermined tension. The first actuator 130 may be operable to move the first sheave 122 away from the second sheave 124 at the predetermined force to thereby maintain the dynamic cable 118 at the predetermined tension. The wind turbine 110 may also or instead comprise a second actuator 132 operatively connected to the second sheave 124. The second actuator 132 may be operable to impart the predetermined force to the second sheave 124 to thereby impart the predetermined force to the dynamic cable 118 and, thus, maintain the dynamic cable 118 at the predetermined tension. The second actuator 132 may be operable to move the second sheave 124 away from the first sheave 122 at the predetermined force to thereby maintain the dynamic cable 118 at the predetermined tension. The first actuator 130 may be or comprise a first hydraulic piston and rod assembly operatively connected to the first sheave 122, and the second actuator 132 may be or comprise a second hydraulic piston and rod assembly operatively connected to the second sheave 124.

Figure 5:
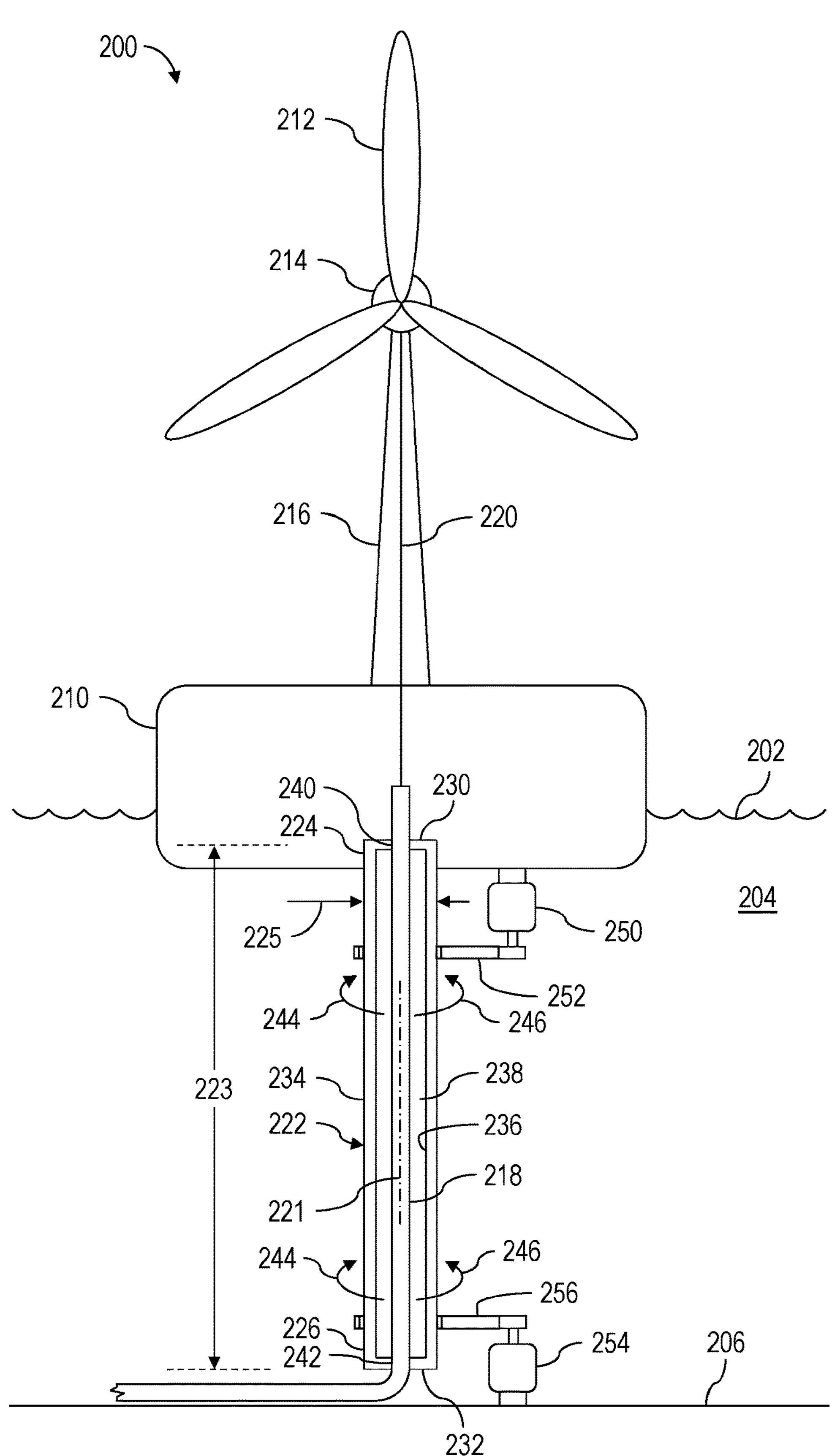
FIG. 5 is a schematic side view of a portion of an example implementation of apparatus according to one or more aspects of the present disclosure.

FIG. 5 is a schematic side view of at least a portion of an example implementation of a wind turbine 200 operable to generate electrical energy, representing an example environment in which one or more aspects of the present disclosure described below may be implemented. The wind turbine 200 may be configured for floating on a surface 202 of a natural body of water 204.

The wind turbine 200 may comprise a floating base 210 configured to support the wind turbine 200 on the surface 202 of the water 204. The floating base 210 may comprise or contain empty space and/or low-density material (e.g., foam) to facilitate buoyancy of the floating base 210, thereby permitting the floating base 210 to support the wind turbine 200 on the surface 202 of the water 204. The wind turbine 200 may further comprise a rotor 212 for converting wind energy to rotational energy. The rotor 212 may be connected to an electric generator 214 for converting rotational energy to electrical energy. A vertical support structure 216 may support the rotor 212 and generator 214 above the floating base 210. The wind turbine 200 may further comprise a dynamic cable 218 configured to transmit the electrical energy from the wind turbine 200 to another wind turbine or an onshore or offshore facility (e.g., an electrical distribution facility, a point of use facility, etc.), at which the electrical energy can be distributed or used. The dynamic cable 218 may be used in (i.e., extend through) a subsea environment below the surface 202 of the water 204 to transmit the electrical energy from the wind turbine 200 to another wind turbine or an onshore or offshore facility. An electrical conductor 220 may extend between the generator 214 and an end of the dynamic cable 218 to electrically connect the generator 214 to the dynamic cable 218.

The wind turbine 200 may further comprise a tubular member (or conduit) 222 extending from the floating base 210 toward the sea floor 206. The dynamic cable 218 may extend from the floating base 210, through the tubular member 222, and out of the tubular member 222 into the water 204. The tubular member 222 may extend downward through the water 204 toward the sea floor 206 below the waves and water currents. The tubular member 222 may fluidly isolate the dynamic cable 218 from the water. Because the portion (or segment) of the dynamic cable 218 extending through the tubular member 222 is not in contact with the water 204, the dynamic cable 218 may not experience biofouling. Furthermore, because the portion of the dynamic cable 218 extending through the tubular member 222 is covered and, thus, protected by the tubular member 222, the dynamic cable 218 may not experience tensile, bending, and twisting forces caused by movements of the floating base, waves, and water currents. The remaining portion of the dynamic cable 218 located below and outside of the tubular member 222, may extend to another wind turbine or facility through deeper water 204 and/or along the sea floor 206 where water currents are weaker. Such remaining portion of the dynamic cable 218 may therefore experience less tensile, bending, and twisting forces caused by the waves and water currents.

The material forming the tubular member 222 may be or comprise carbon fiber reinforced with epoxy. Height (or length) 223 of the tubular member 222 may range between about 50 meters (164 feet) and 100 meters (328 feet). Outer diameter 225 of the tubular member 222 may range between about 200 millimeters (7.87 inches) and 500 millimeters (19.69 inches).

The tubular member 222 may comprise an upper outer surface (or face) 230, a lower outer surface (or face) 232, and an intermediate outer surface 234 extending between the upper surface 230 and lower surface 232. The tubular member 222 may further comprise an internal surface 236 defining a central (or axial) passage (i.e., a bore or empty space) 238 configured to accommodate (or pass) the dynamic cable 218 therethrough. The surfaces 230, 232 may have a circular geometry and the surfaces 234, 236 may have a cylindrical geometry. The dynamic cable 218 may extend longitudinally through the passage 238 of the tubular member 222, from an upper portion (e.g., upper end) 224 of the tubular member 222 to a lower portion (e.g., lower end) 226 of the tubular member 222. Thus, the dynamic cable 218 may enter the tubular member 222 at the floating base 210 and exit the tubular member 222 at the lower portion 226 of the tubular member 222.

The tubular member 222 may comprise an upper opening (or hole) 240 at the upper portion 224 configured to accommodate an upper portion of the dynamic cable 218. The tubular member 222 may further comprise a lower opening (or hole) 242 at the lower portion 226 configured to accommodate a lower portion of the dynamic cable 218. The upper opening 240 may extend through the upper surface 230 of the tubular member 222 and the lower opening 242 may extend through the lower surface 232 of the tubular member 222. The upper portion 224 of the tubular member 222 may seal around the upper portion of the dynamic cable 218 such that the water 204 does not enter the passage 238 though the upper opening 240 and contact the dynamic cable 218. Similarly, the lower portion 226 of the tubular member 222 may seal around the lower portion of the dynamic cable 218 such that the water 204 does not enter the passage 238 though the lower opening 242 and contact the dynamic cable 218.

The tubular member 222 may be operable to rotate about its longitudinal axis 221 while the dynamic cable 218 extends through the tubular member 222. Thus, an upper rotating fluid seal (not shown) may be installed within the opening 240 between the upper portion 224 of the tubular member 222 and the dynamic cable 218, and a lower rotating fluid seal (not shown) may be installed within the opening 242 between the lower portion 226 of the tubular member 222 and the dynamic cable 218, such that the water 204 does not enter the passage 238 though the openings 240, 242 while the tubular member 222 rotates. Rotation of the tubular member 222 may prevent or reduce biofouling along the external surfaces 230, 232, 234 of the tubular member 222.

The entire tubular member 222 may be operable to rotate continuously in a single direction, such as a first direction indicated by arrows 244 or a second direction indicated by arrows 246. Rate of rotation of the tubular member 222 may range between about 0.5 and 3.0 rotations per day. Example rates of rotation may include one rotation per day, two rotations per day, or 3 rotations per day. The first direction 244 and the second direction 246 may be opposite from each other. The entire tubular member 222 may also or instead be operable to rotationally oscillate (rotate back and forth) in opposing directions, as indicated by the arrows 244, 246. The angle of each rotational oscillation (movement cycle) may range between about 10 degrees and 90 degrees. Example angles of rotational oscillation may include 10 degrees, 20 degrees, 30 degrees, 45 degrees, 60 degrees, and 90 degrees. The frequency of each rotational oscillation of the tubular member 222 in opposing directions 244, 246 may range between about 1.0 and 4.0 rotational oscillations per day. Example frequencies of rotational oscillation may include one rotational oscillation per day, two rotational oscillations per day, three rotational oscillations per day, and four rotational oscillations per day.

Rotation of the tubular member 222 may be facilitated by an actuator 250 operatively connected to the tubular member 222 and operable to rotate the tubular member 222 about its longitudinal axis 221. The actuator 250 may be or comprise a rotational actuator (e.g., an electric motor, a hydraulic motor, etc.) operatively connected to the tubular member 222 via one or more power transfer devices 252 (e.g., teeth, gears, pulleys, belts, chains, etc.) operatively connecting the actuator 250 to the tubular member 222. The actuator 250 may instead be or comprise a linear actuator (e.g., an electric linear actuator, a hydraulic piston and rod assembly, a pneumatic piston and rod assembly, etc.) operatively connected to the tubular member 222 via one or more power transfer devices 252 (e.g., levers, linkages, arms, etc.) operatively connecting the actuator 250 to the tubular member 222. The actuator 250 may be connected to or supported by the floating base 210.

Different portions of the tubular member 222 may also or instead be operable to rotate independently of each other. For example, the upper portion 224 of the tubular member 222 may be operable to rotate in the first direction 244 about its longitudinal axis 221 while the lower portion 226 of the tubular member 222 may be operable to rotate in the second direction 246 about its longitudinal axis 221. The directions of rotation may then reverse, such that the upper portion 224 of the tubular member 222 rotates in the second direction 246 about its longitudinal axis 221 while the lower portion 226 of the tubular member 222 rotates in the first direction 244 about its longitudinal axis 221. Thus, the upper portion 224 and the lower portion 226 may rotationally oscillate in opposing directions, as indicated by the arrows 244, 246. When the upper portion 224 and the lower portion 226 rotate in opposing directions, the tubular member 222 may experience torsional (or angular) flexing (or bending). The angle of each rotational oscillation may range between about 10 degrees and 90 degrees. Example angles of rotational oscillation may include 10 degrees, 20 degrees, 30 degrees, 45 degrees, 60 degrees, and 90 degrees. The frequency of each rotational oscillation of the upper portion 224 and/or the lower portion 226 of the tubular member 222 in opposing directions 244, 246 may range between about 1.0 and 4.0 rotational oscillations per day. Example frequencies of rotational oscillation may include one rotational oscillation per day, two rotational oscillations per day, three rotational oscillations per day, and four rotational oscillations per day.

Rotation of the upper portion 224 of the tubular member 222 may be facilitated by the upper actuator 250 operatively connected to the upper portion 224 of the tubular member 222 and operable to rotate the upper portion 224 of the tubular member 222 about its longitudinal axis 221. Rotation of the lower portion 226 of the tubular member 222 may be facilitated by a lower actuator 254 operatively connected to the lower portion 226 of the tubular member 222 and operable to rotate the lower portion 226 of the tubular member 222 about its longitudinal axis 221. The lower actuator 254 may be or comprise a rotational actuator (e.g., an electric motor, a hydraulic motor, etc.) operatively connected to the lower portion 226 of the tubular member 222 via one or more lower power transfer devices 256 (e.g., teeth, gears, pulleys, belts, chains, etc.) operatively connecting the lower actuator 254 to the lower portion 226 of the tubular member 222. The lower actuator 254 may instead be or comprise a linear actuator (e.g., an electric linear actuator, a hydraulic piston and rod assembly, a pneumatic piston and rod assembly, etc.) operatively connected to the lower portion 226 of the tubular member 222 via one or more lower power transfer devices 256 (e.g., levers, linkages, arms, etc.) operatively connecting the actuator 250 to the lower portion 226 of the tubular member 222. The lower actuator 254 may be connected to or supported by the sea floor 206.

During rotational operations, the upper actuator 250 may be operable to rotate the upper portion 224 of the tubular member 222 in the first direction 244 about its longitudinal axis, and the lower actuator 254 may be operable to rotate the lower portion 226 of the tubular member 222 in the second direction 246 about its longitudinal axis. During rotational operations, the directions of rotation of the upper portion 224 of the tubular member 222 and the lower portion 226 of the tubular member 222 may be reversed. For example, the upper actuator may be operable to rotate the upper portion 224 of the tubular member 222 in the second direction 246 about its longitudinal axis, and the lower actuator 254 may be operable to rotate the lower portion 226 of the tubular member 222 in the first direction 244 about its longitudinal axis. Thus, the upper actuator 250 and the lower actuator 256 may rotationally oscillate the upper portion 224 and the lower portion 226 in opposing directions, as indicated by the arrows 244, 246.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same functions and/or achieving the same benefits of the embodiments introduced herein. A person having ordinary skill in the art should also realize that such equivalent constructions do not depart from the spirit and scope of the present disclosure, and that they may make various changes, substitutions, and alterations herein without departing from the scope of the present disclosure.

What is claimed is:

1. An apparatus comprising:

a wind turbine configured for floating on a surface of water, wherein the wind turbine is operable to generate electrical energy, and wherein the wind turbine comprises:

a floating base configured to support the wind turbine on the surface of water;

a cable configured to transmit the electrical energy;

a first sheave configured to support at least one first part of the cable; and a second sheave configured to support at least one second part of the cable, wherein the cable is reeved between the first sheave and the second sheave, wherein the first sheave is operable to impart a predetermined force to the cable to thereby maintain the cable at a predetermined tension, wherein, when movement of the water causes an increased tension in the cable, the increased tension in the cable forces the first sheave to move toward the second sheave decreasing the distance between the first sheave and the second sheave to thereby permit the cable to be pulled out from between the first sheave and second sheave and move with the water; and wherein, when the water does not cause the increased tension in the cable, the first sheave moves away from the second sheave increasing the distance between the first sheave and the second sheave to thereby retract the cable to between the first sheave and the second sheave.

2. The apparatus of claim 1 wherein the first sheave and the second sheave are disposed within the floating base.

3. The apparatus of claim 1 wherein:

the at least one first part of the cable includes a plurality of first parts of the cable;

the first sheave is or comprises a first sheave block configured to support the plurality of first parts of the cable;

the at least one second part of the cable includes a plurality of second parts of the cable; and the second sheave is or comprises a second sheave block configured to support the plurality of second parts of the cable.

4. The apparatus of claim 1 wherein the first sheave is operable to move away from the second sheave at the predetermined force to thereby maintain the cable at the predetermined tension.

5. The apparatus of claim 4 wherein the second sheave is operable to move away from the first sheave at the predetermined force to thereby maintain the cable at the predetermined tension.

6. The apparatus of claim 1 wherein the wind turbine further comprises an actuator operable to move the first sheave away from the second sheave at the predetermined force to thereby maintain the cable at the predetermined tension.

7. The apparatus of claim 6 wherein the actuator is or comprises a hydraulic piston and rod assembly operatively connected to the first sheave.

* * * * *